US005690138A

United States Patent [19]

Fuller

[11] Patent Number: 5,690,138

[45] Date of Patent: Nov. 25, 1997

[54] RECEPTACLE FOR A DRIPPING SPIGOT

[76] Inventor: Lawrence W. Fuller, 240 Mariposa Ave., Sierra Madre, Calif. 91024

[21] Appl. No.: 728,966

[22] Filed: Oct. 11, 1996

[51] Int. Cl.[6] .............................. F16K 23/00; B67D 1/16

[52] U.S. Cl. .............................. 137/312; 141/86; 220/571; 222/108

[58] Field of Search .............................. 137/312, 313; 141/86, 87, 88; 184/1.5; 222/108, 110; 220/571

[56] References Cited

U.S. PATENT DOCUMENTS

| | | | |
|---|---|---|---|
| 217,133 | 7/1879 | Meinen | 137/312 |
| 555,820 | 3/1896 | Kaup | 137/313 |
| 699,481 | 5/1902 | Boyd | 137/313 |
| 702,181 | 6/1902 | Boyd | 137/313 |
| 831,713 | 9/1906 | Ferguson | 137/313 |
| 956,562 | 5/1910 | Beers et al. | 137/312 |
| 1,456,045 | 5/1923 | Wilkin | 137/313 |
| 1,520,511 | 12/1924 | Reymore | 137/313 |
| 1,703,284 | 2/1929 | Wolfe | 137/312 |
| 3,131,711 | 5/1964 | Delaney | 137/312 |
| 5,165,574 | 11/1992 | Ratcliffe | 137/313 |

FOREIGN PATENT DOCUMENTS

| | | | |
|---|---|---|---|
| 575926 | 8/1924 | France | 137/313 |
| 607030 | 6/1926 | France | 137/313 |
| 684758 | 7/1930 | France | 137/313 |
| 768536 | 8/1934 | France | 137/313 |
| 358273 | 9/1922 | Germany | 137/313 |
| 284866 | 2/1928 | United Kingdom | 222/108 |

*Primary Examiner*—George L. Walton

[57] ABSTRACT

A receptacle for a dripping spigot including a base member having an open upper end, a closed lower end and a cylindrical side wall therebetween. A back splash member extends upwardly from the open upper end of the base member. A securement aperture is formed through the back splash member downwardly of an upper end thereof. The securement aperture is dimensioned for receiving a spigot therethrough for attachment of the receptacle to catch drips therefrom.

8 Claims, 3 Drawing Sheets

FIG 5
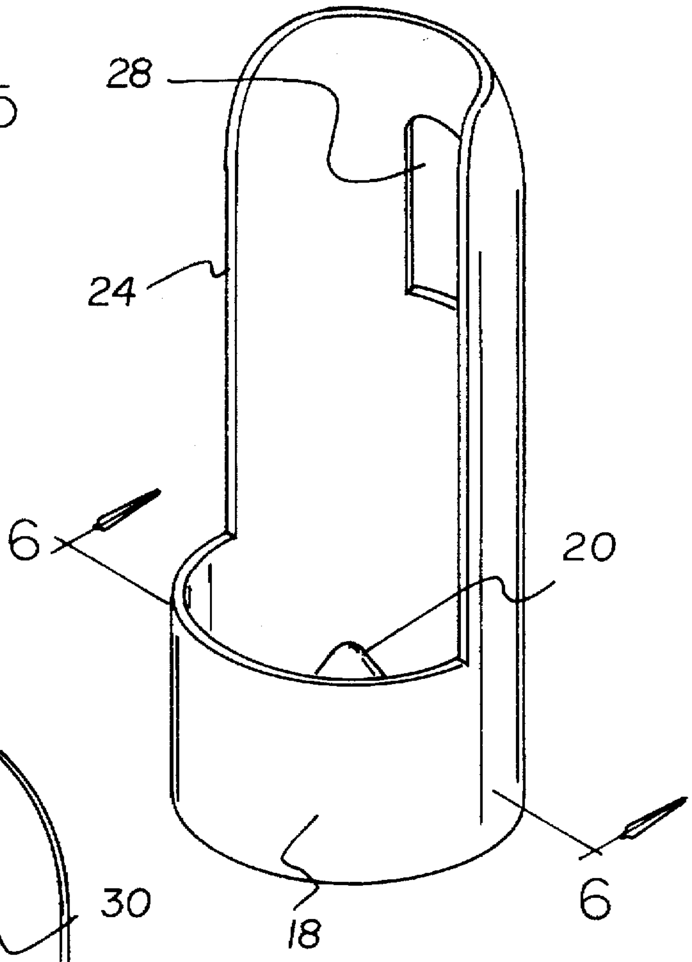
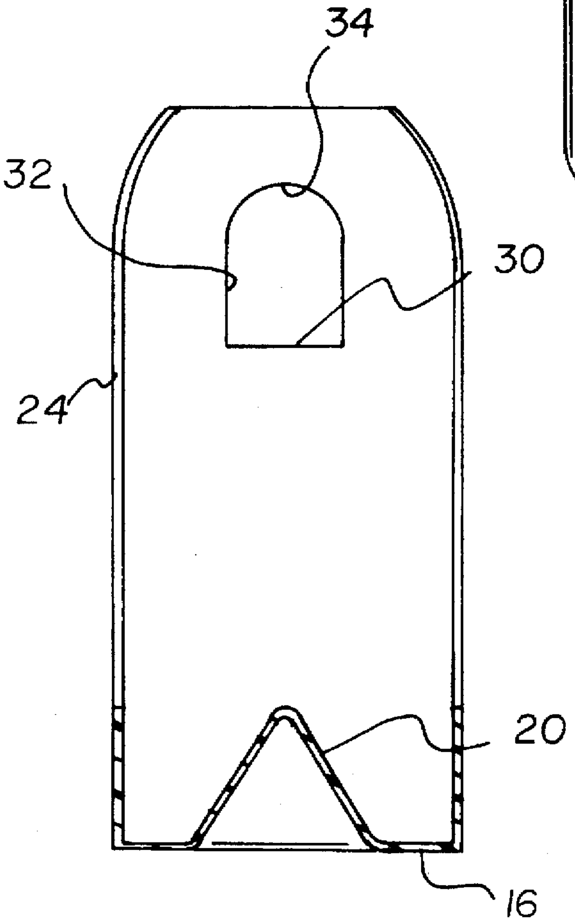
FIG 6

RECEPTACLE FOR A DRIPPING SPIGOT

BACKGROUND OF THE INVENTION

1. Field of the Invention

The present invention relates to a receptacle for a dripping spigot and more particularly pertains to catching spigot leakage to prevent damage to a table top and floors with a receptacle for a dripping spigot.

2. Description of the Prior Art

The use of drip catchers is known in the prior art. More specifically, drip catchers heretofore devised and utilized for the purpose of catching dripping liquids are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,865,225 to Chavez et al. discloses a universal drip catcher.

U.S. Pat. No. 4,496,354 to Steer et al. discloses a drainage bag assembly with drip tray.

U.S. Pat. No. Des. 259,712 to Heydenrich discloses the ornamental design for a drip receptacle for a hanging plant container.

U.S. Pat. No. 5,339,872 to Marino discloses a spill containment bag.

U.S. Pat. No. 5,063,977 to Belland discloses a beverage receptacle tray for extra-large receptacles.

U.S. Pat. No. 5,452,739 to Mustee et al. discloses an overflow tray.

While these devices fulfill their respective, particular objective and requirements, the aforementioned patents do not describe a receptacle for a dripping spigot for catching spigot leakage to prevent damage to a table top and floors.

In this respect, the receptacle for a dripping spigot according to the present invention substantially departs from the conventional concepts and designs of the prior art, and in doing so provides an apparatus primarily developed for the purpose of catching spigot leakage to prevent damage to a table top and floors.

Therefore, it can be appreciated that there exists a continuing need for new and improved receptacle for a dripping spigot which can be used for catching spigot leakage to prevent damage to a table top and floors. In this regard, the present invention substantially fulfills this need.

SUMMARY OF THE INVENTION

In the view of the foregoing disadvantages inherent in the known types of drip catchers now present in the prior art, the present invention provides an improved receptacle for a dripping spigot. As such, the general purpose of the present invention, which will be described subsequently in greater detail, is to provide a new and improved receptacle for a dripping spigot and method which has all the advantages of the prior art and none of the disadvantages.

To attain this, the present invention essentially comprises a base member having an open upper end, a closed lower end and a cylindrical side wall therebetween. The closed lower end has a conical member integral with an inner surface at a central location thereof. The conical member extends upwardly to a height level with the open upper end. A base of the conical member has a diameter equal to a diameter of the closed lower end. The device includes a back splash member extending upwardly from the open upper end of the base member. The back splash member has an elongated and arcuate configuration. The back splash member has a radius of curvature greater than half of a radius of curvature of the open upper end of the base member. A securement aperture is formed through the back splash member downwardly of an upper end thereof. The securement aperture has a planar lower edge, opposed planar side edges and an arcuate upper edge. The securement aperture is dimensioned for receiving a spigot therethrough for attachment of the receptacle to catch drips therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved receptacle for a dripping spigot which has all the advantages of the prior art drip catchers and none of the disadvantages.

It is another object of the present invention to provide a new and improved receptacle for a dripping spigot which may be easily and efficiently manufactured and marketed.

It is a further object of the present invention to provide a new and improved receptacle for a dripping spigot which is of durable and reliable construction.

An even further object of the present invention is to provide a new and improved receptacle for a dripping spigot which is susceptible of a low cost of manufacture with regard to both materials and labor, and which accordingly is then susceptible of low prices of sale to the consuming public, thereby making such a receptacle for a dripping spigot economically available to the buying public.

Even still another object of the present invention is to provide a new and improved receptacle for a dripping spigot for catching spigot leakage to prevent damage to a table top and floors.

Lastly, it is an object of the present invention to provide a new and improved receptacle for a dripping spigot including a base member having an open upper end, a closed lower end and a cylindrical side wall therebetween. A back splash member extends upwardly from the open upper end of the base member. A securement aperture is formed through the back splash member downwardly of an upper end thereof. The securement aperture is dimensioned for receiving a spigot therethrough for attachment of the receptacle to catch drips therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an elevated perspective view of the present invention.

FIG. 6 is a cross-sectional view as taken along line 6—6 of FIG. 5.

The same reference numerals refer to the same parts through the various Figures.

DESCRIPTION OF THE PREFERRED EMBODIMENT

Figure 1:
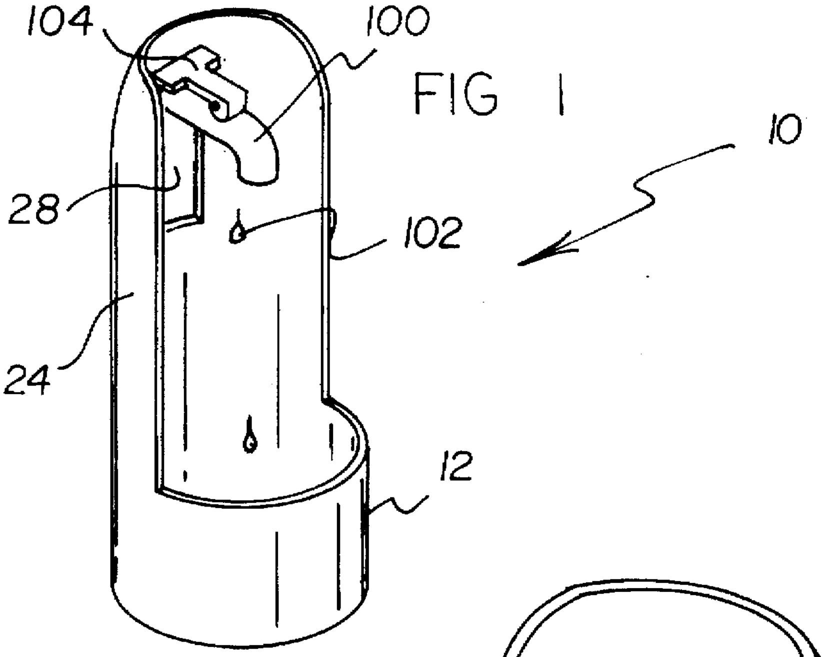
FIG. 1 is a perspective view of the preferred embodiment of the receptacle for a dripping spigot constructed in accordance with the principles of the present invention.
Figure 2:
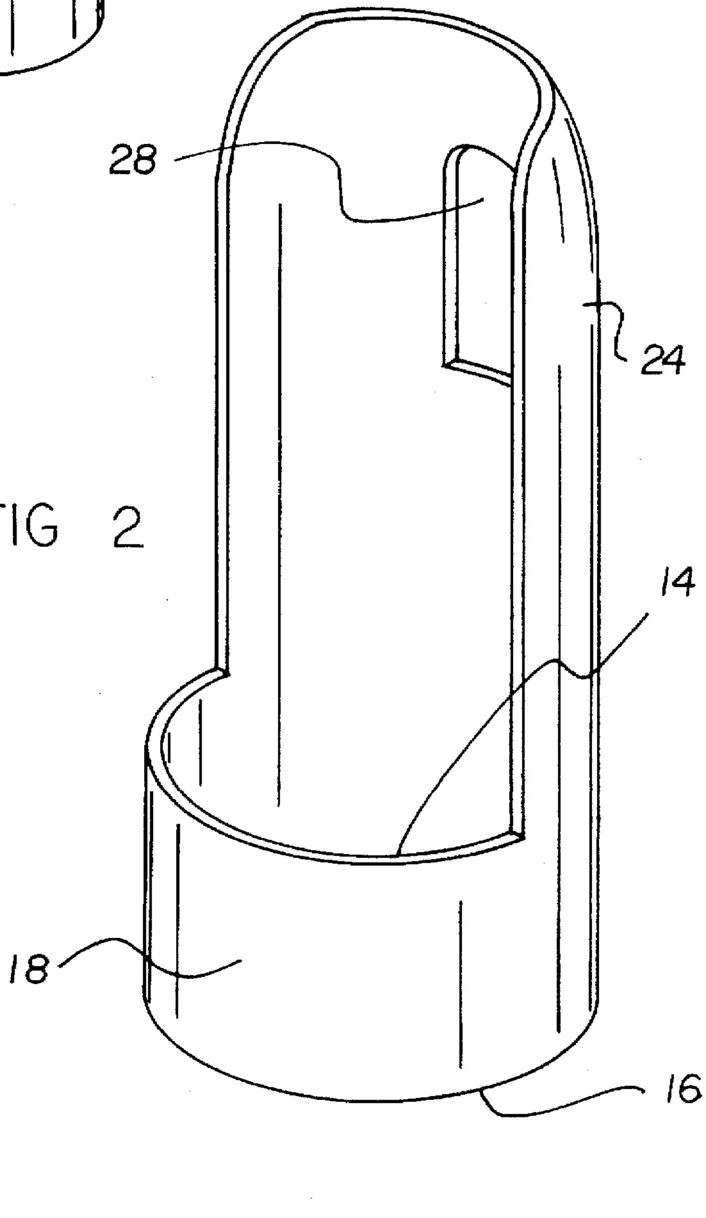
FIG. 2 is an isometric view of the present invention.
Figure 3:
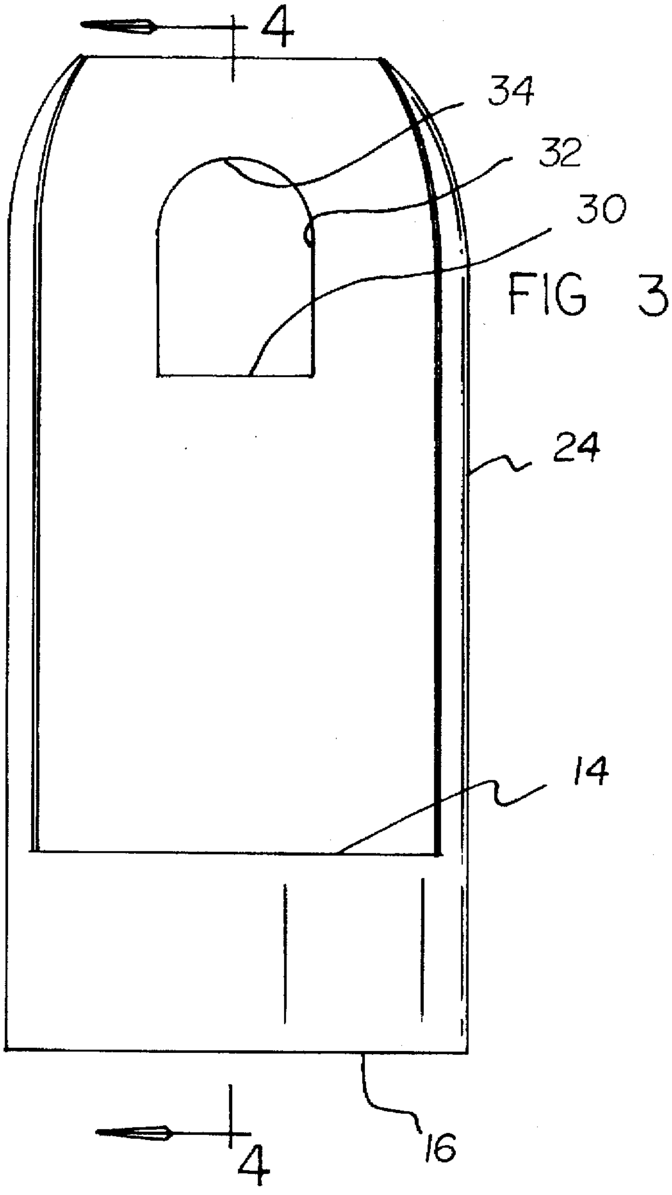
FIG. 3 is a front elevation view of the present invention.
Figure 4:
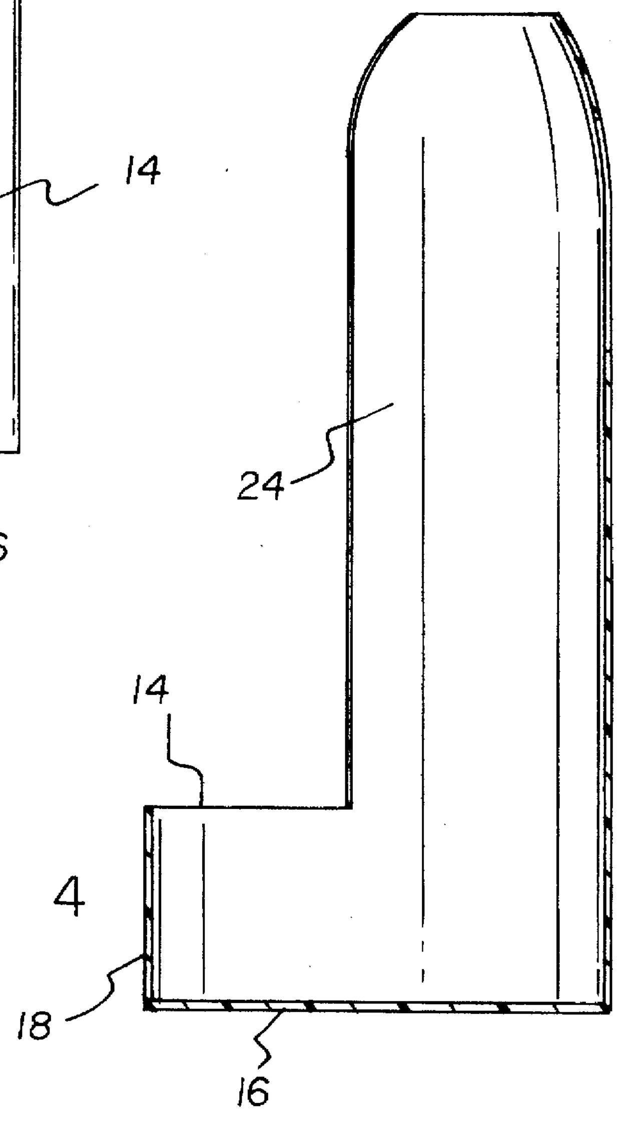
FIG. 4 is a cross-sectional view as taken along line 4—4 of FIG. 3.

With reference now to the drawings, and in particular, to FIGS. 1–6 thereof, the preferred embodiment of the new and improved receptacle for a dripping spigot embodying the principles and concepts of the present invention and generally designated by the reference number 10 will be described.

Specifically, it will be noted in the various Figures that the device relates to a receptacle for a dripping spigot for catching spigot leakage to prevent damage to a table top and floors. In its broadest context, the device consists of a base member, a backsplash member and a securement aperture. Such components are individually configured and correlated with respect to each other so as to attain the desired objective.

The device 10 includes a base member 12 having an open upper end 14, a closed lower end 16 and a cylindrical side wall 18 therebetween. The closed lower end 16 has a conical member 20 integral with an inner surface at a central location thereof. The conical member 20 extends upwardly to a height level with the open upper end 14. A base of the conical member 20 has a diameter equal to a diameter of the closed lower end 16. The construction of the base member 12 is preferably of a molded plastic.

Next, the device 10 includes a back splash member 24 extending upwardly from the open upper end 14 of the base member 12. The back splash member 24 has an elongated and arcuate configuration. The back splash member 24 has a radius of curvature greater than half of a radius of curvature of the open upper end 14 of the base member 12. The height of the back splash member 24 is greater than four times the height of the base member 12.

Lastly, a securement aperture 28 is formed through the back splash member 24 downwardly of an upper end thereof. The securement aperture 28 has a planar lower edge 30, opposed planar side edges 32 and an arcuate upper edge 34. The securement aperture 28 is dimensioned for receiving a spigot 100 therethrough for attachment of the device 10 to catch drips 102 therefrom. Note FIG. 1. The arcuate upper edge 34 allows the device 10 to remain evenly distributed on the generally rounded surface of the spigot 100. The handle 104 of the spigot 100 will prevent the device 10 from sliding off of the spigot 100.

This device 10 will be secured over spigots 100 of self-serve coffee dispensers and large commercial water and beverage self-serve dispensers and the like in order to prevent drips from the spigot 100 from causing any damage to a floor or other recipient surface. The conical member 24 will serve to absorb any splashing that would otherwise occur if the drips were to contact a flat surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A receptacle for a dripping spigot for catching spigot leakage to prevent damage to a table top and floors comprising, in combination:

a base member having an open upper end, a closed lower end and a cylindrical side wall therebetween, the closed lower end having a conical member integral with an inner surface at a central location thereof, the conical member extending upwardly to a height level with the open upper end, a base of the conical member having a diameter equal to a diameter of the closed lower end, the conical member serving to absorb splashing from leakage that would otherwise occur if contacting a flat surface;

a back splash member extending upwardly from the open upper end of the base member, the back splash member having an elongated and arcuate configuration, the back splash member having a radius of curvature greater than half of a radius of curvature of the open upper end of the base member;

a securement aperture formed through the back splash member downwardly of an upper end thereof, the securement aperture having a planar lower edge, opposed planar side edges and an arcuate upper edge, the securement aperture dimensioned for removably receiving a spigot therethrough for attachment of the receptacle to the spigot and freely extending therefrom and supported thereby to catch drips therefrom.

2. A receptacle for a dripping spigot comprising:

a base member having an open upper end, a closed lower end and a cylindrical side wall therebetween;

a back splash member extending upwardly from the open upper end of the base member;

a securement aperture formed through the back splash member downwardly of an upper end thereof, the securement aperture dimensioned for removably receiving a spigot therethrough for attachment of the receptacle and freely extending therefrom and supported thereby to the spigot to catch drips therefrom.

3. The receptacle as set forth in claim 2 wherein the closed lower end of the base member having a conical member integral with an inner surface at a central location thereof, the conical member serving to absorb splashing from leakage that would otherwise occur if contacting a flat surface.

4. The receptacle as set forth in claim 3 wherein the conical member extending upwardly to a height level with the open upper end of the base member.

5. The receptacle as set forth in claim 4 wherein a base of the conical member having a diameter equal to a diameter of the closed lower end of the base member.

6. The receptacle as set forth in claim 5 wherein the back splash member having an elongated and arcuate configuration.

7. The receptacle as set forth in claim 6 wherein the back splash member having a radius of curvature greater than half of a radius of curvature of the open upper end of the base member.

8. The receptacle as set forth in claim 7 wherein the securement aperture having a planar lower edge, opposed planar side edges and an arcuate upper edge.

* * * * *